US011028872B2

(12) United States Patent
Poster

(10) Patent No.: US 11,028,872 B2
(45) Date of Patent: Jun. 8, 2021

(54) MULTI-DRILLED FASTENERS

(71) Applicant: TEXTRON INNOVATIONS INC., Providence, RI (US)

(72) Inventor: Scott David Poster, Arlington, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 13 days.

(21) Appl. No.: 16/516,365

(22) Filed: Jul. 19, 2019

(65) Prior Publication Data
US 2019/0360517 A1 Nov. 28, 2019

Related U.S. Application Data

(62) Division of application No. 15/463,773, filed on Mar. 20, 2017, now Pat. No. 10,400,812.

(60) Provisional application No. 62/399,097, filed on Sep. 23, 2016, provisional application No. 62/423,371, filed on Nov. 17, 2016.

(51) Int. Cl.
*F16B 39/04* (2006.01)
*F16B 33/02* (2006.01)

(52) U.S. Cl.
CPC .............. *F16B 39/04* (2013.01); *F16B 33/02* (2013.01); *Y10T 29/49947* (2015.01); *Y10T 29/49948* (2015.01); *Y10T 29/49963* (2015.01); *Y10T 29/49966* (2015.01)

(58) Field of Classification Search
CPC .......... F16B 21/02; F16B 33/02; F16B 39/04; Y10S 411/945; Y10T 29/49966

USPC ....... 411/314, 315, 316, 320, 364, 427, 437, 411/511, 513, 515, 933
See application file for complete search history.

(56) References Cited

U.S. PATENT DOCUMENTS

| 121,176 | A | * | 11/1871 | Lamb | F16B 39/04 411/200 |
|---|---|---|---|---|---|
| 1,105,606 | A | * | 8/1914 | Beach | F16B 39/04 411/320 |
| 1,126,847 | A | | 2/1915 | Pardinin | |
| 1,283,346 | A | * | 10/1918 | Spear | F16B 39/04 411/213 |
| 1,438,312 | A | | 12/1922 | Kerwin | |
| 1,540,055 | A | * | 6/1925 | Chilton | F16B 39/04 411/213 |
| 1,548,688 | A | | 8/1925 | Johnson | |

(Continued)

FOREIGN PATENT DOCUMENTS

| CH | 473322 | 5/1969 |
|---|---|---|
| DE | 24396 | 3/1883 |

(Continued)

OTHER PUBLICATIONS

Bell Helicopter, Flight International "Bell 525 Relentless" Nov. 12, 2014.

(Continued)

*Primary Examiner* — Roberta S Delisle
(74) *Attorney, Agent, or Firm* — Edwin S. Flores; Daniel J. Chalker; Chalker Flores, LLP

(57) ABSTRACT

The present invention includes a fastener comprising: a fastener body having a longitudinal axis and a first external male threaded portion, and two or more through-holes perpendicular to the longitudinal axis of the fastener body in the threaded portion.

10 Claims, 5 Drawing Sheets

(56) References Cited

U.S. PATENT DOCUMENTS

| | | | | |
|---|---|---|---|---|
| 1,596,000 | A | * | 8/1926 | Crowell .................. F16B 39/04 411/320 |
| 1,621,346 | A | | 3/1927 | Beatty |
| 1,858,709 | A | * | 5/1932 | Johnson .................. F16B 39/04 411/320 |
| 1,994,132 | A | * | 3/1935 | Harbridge ............... F16B 39/04 411/320 |
| 2,360,626 | A | * | 10/1944 | Weiser .................... F16B 39/04 411/213 |
| 2,393,519 | A | * | 1/1946 | Crowther ................ F16B 39/08 411/320 |
| 3,638,980 | A | | 2/1972 | Kleinhenn |
| 3,965,954 | A | | 6/1976 | Lofredo |
| 4,655,657 | A | | 4/1987 | Duran |
| 4,995,274 | A | | 2/1991 | Kleeman |
| 5,120,170 | A | | 6/1992 | Kalies |
| 5,685,681 | A | | 11/1997 | Smith, II |
| 8,845,256 | B2 | | 9/2014 | Gaw |
| 2005/0125962 | A1 | * | 6/2005 | Hong ..................... F16B 45/02 24/265 H |
| 2012/0039686 | A1 | | 2/2012 | Miller et al. |
| 2013/0117997 | A1 | | 5/2013 | Ehinger et al. |
| 2018/0087557 | A1 | | 3/2018 | Poster |

FOREIGN PATENT DOCUMENTS

| | | |
|---|---|---|
| DE | 202006004279 | 6/2006 |
| EP | 3299640 A1 | 3/2018 |

OTHER PUBLICATIONS

Perry, Dominic "ANALYSIS: Bell 525 Relentless cutaway and technical Description" https://www.flightglobal.com/news/articles/analysis-bell-525-relentless-cutaway-and-technical-4055411, Source: Bell Helicopter,Flight International, London, Nov. 12, 2014, 8 pp.

European Patent Office, European Search Report for EP Appl. No. 17190420.4 dated Feb. 6, 2018, 4 pp.

European Patent Office, Communication pursuant to Article 94(3) EPC for EP Appl. No. 17190420.4 dated Feb. 27, 2018, 8 pp.

European Patent Office, Communication pursuant to Article 94(3) EPC for EP Appl. No. 17190420.4 dated Sep. 20, 2018, 4 pp.

European Patent Office, Communication pursuant to Article 94(3) EPC for EP Appl. No. 17190420.4 dated Feb. 13, 2019, 5 pp.

* cited by examiner

MULTI-DRILLED FASTENERS

CROSS-REFERENCE TO RELATED APPLICATIONS

This patent application claims priority to and is a divisional patent application of U.S. patent application Ser. No. 15/463,773, which claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

Not applicable.

TECHNICAL FIELD OF THE INVENTION

The present invention relates in general to the field of fasteners, and more particularly, to a double drilled or multi drilled fastener that eliminates having to swap out fasteners, add, remove, or change outwashers to optimize engagement with castellated nuts during installation.

BACKGROUND OF THE INVENTION

Without limiting the scope of the invention, its background is described in connection with fasteners.

One such fastener is taught in U.S. Pat. No. 8,845,256, issued to Gaw, entitled, "Fastener and Fastener Assembly with Discontinuous Threadform". This inventor is said to teach a fastener comprising a cylindrical shaft, a head attached to the shaft, and two or more external longitudinal threadforms, where each threadform comprises a plurality of spaced protrusions forming a separate sinusoidal path around the shaft. When the shaft is inserted into a corresponding mating receptacle, a combination of the shaft and the mating receptacle provides two or more pitches. The disclosure is said to further provide for a fastener assembly.

Another such fastener is taught in U.S. Patent Publication No. 2013/0117997, filed by Ehinger, et al., and entitled "System and Method for Installing a Fastener Rod". These inventors teach a system and method for installing a fastener rod that includes a fastener rod starter apparatus that includes a first end for engaging a fastener rod, a second end for insertion into an insertion hole, and an elongated body of closed cell foam having sufficiently low density and high compressibility to displace fluid in the insertion hole and be compressed to allow installation of the fastener rod into the insertion hole. A method for installing a fastener rod may also include lubricating an insertion hole with a fluid and inserting a starter element into the insertion hole. The starter element may have sufficiently low density and high compressibility to displace the fluid in the insertion hole and be compressed by the fastener rod inserted into the insertion hole.

SUMMARY OF THE INVENTION

In one embodiment, the present invention includes a fastener comprising: a fastener body having a longitudinal axis and a first external male threaded portion, and two or more through-holes perpendicular to the longitudinal axis of the fastener body in the threaded portion, wherein each of the through-holes is adapted to receive a pin. In one aspect, the fastener further comprising a head opposite the first external male threaded portion. In another aspect, the fastener comprising a second external male thread opposite the first external male thread. In another aspect, a longitudinal axis of the two or more holes through-holes form an angle between 0 and 90 degrees. In another aspect, the through-holes are intersecting or non-intersecting. In another aspect, the through-holes are sized to hold a pin, wherein the pin is selected from at least one of a split pin, a hairpin cotter pin, a bowtie cotter pin, a circle cotter, or a cotter pin, or a lockwire. In another aspect, the first external male threaded portion extends throughout the body to a seat surface on a head portion on the body opposite the first external male threaded portion. In another aspect, the first external male threaded portion is configured to matingly engage a fastening member having two or more openings or notches through which the pin is inserted to prevent loosening of the fastening member as a result of vibration. In another aspect, the first external male threaded portion and the through-holes are configured to matingly engage a castellated fastener. In another aspect, each of the two or more through-holes is on a different plane.

In another embodiment, the present invention includes a method of fastening two or more objects comprising: providing a fastener body having a longitudinal axis and a first external male threaded portion, and two or more through-holes perpendicular to the longitudinal axis of the fastener body in the threaded portion, wherein each of the through-holes is on a different plane; and tightening a fastening member configured to matingly engage the first external male threaded portion, wherein at least one of the two or more through-holes is capable of receiving a pin without having to adjust the fastening member such that compression is maintained between the two or more objects. In one aspect, the method further comprises disposing a head opposite the first external male threaded portion. In another aspect, the method further comprises disposing a second external male thread opposite the first external male thread. In another aspect, a longitudinal axis of the two or more through-holes form an angle between 0 and 90 degrees. In another aspect, the through-holes are intersecting or non-intersecting. In another aspect, the method further comprises sizing the through-holes to hold a pin, a split pin, a hairpin cotter pin, a bowtie cotter pin, a circle cotter, a cotter pin, or a lock-wire. In another aspect, the first external male threaded portion extends throughout the body to a seat surface on a head portion on the body opposite the first external male threaded portion. In another aspect, first external male threaded portion is configured to matingly engage a fastening member having two or more openings or notches through which the pin is inserted to prevent loosening of the fastening member as a result of vibration. In another aspect, the first external male threaded portion and the through-holes are configured to matingly engage a castellated fastener, and wherein at least one of the first and second through-holes is selected to align with an aligned pair of notches in the castellated fastener, and the other through-hole aligns with and is blocked by the pair of notches.

In another embodiment, the present invention includes a method of fastening two or more objects on a rotorcraft comprising: providing a fastener body having a longitudinal axis and a first external male threaded portion, and two or more through-holes perpendicular to the longitudinal axis of the fastener body in the threaded portion, wherein each of the through-holes is on a different plane; and tightening a fastening member configured to matingly engage the first external male threaded portion, wherein at least one of the two or more through-holes is capable of receiving a pin without having to adjust the fastening member such that a specific torque or compression is maintained between the two or more objects. In one aspect, the pin is a split pin, a hairpin cotter pin, a bowtie cotter pin, a circle cotter, a cotter pin, or a lockwire.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
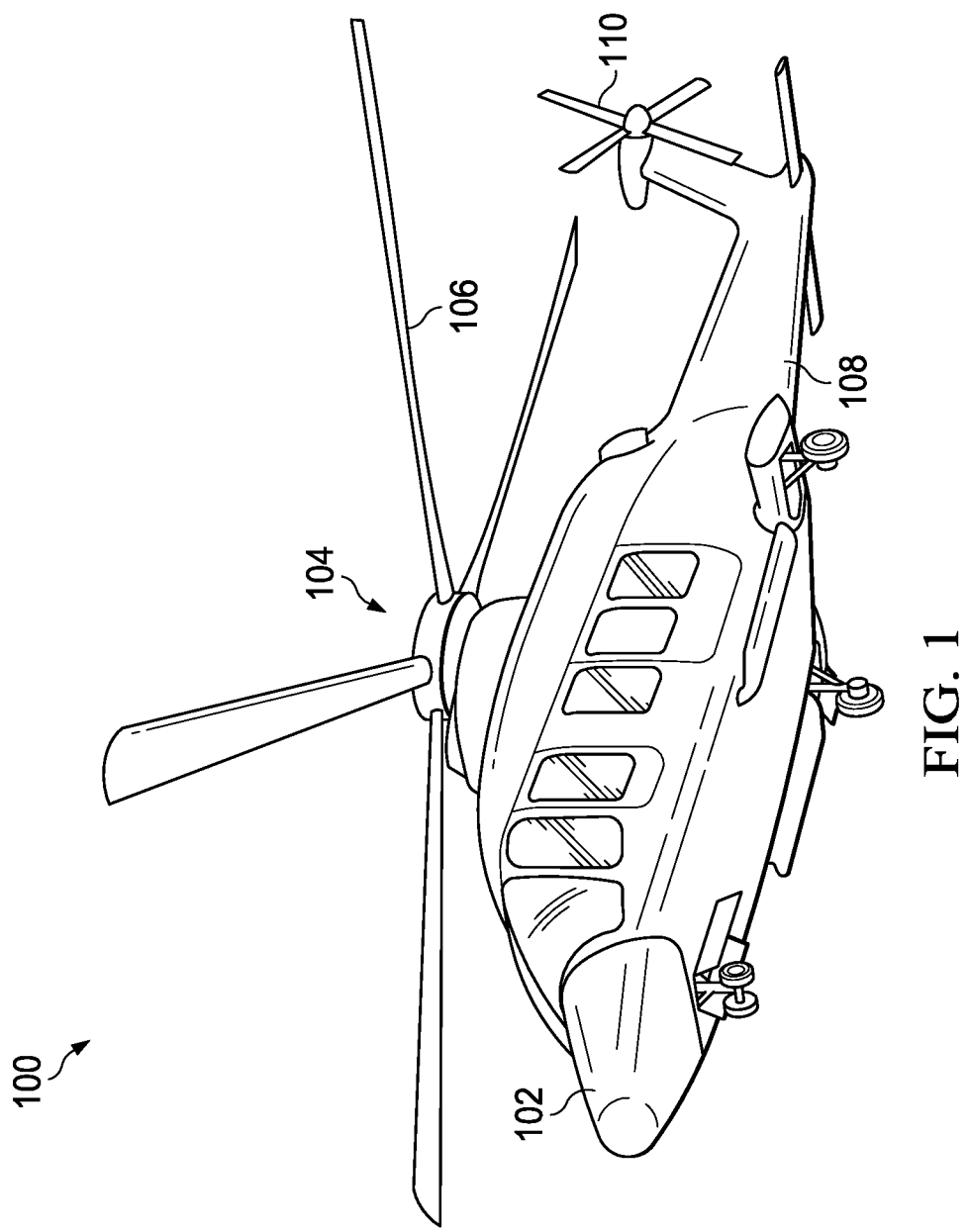
FIG. 1 shows a side view of a helicopter according to a preferred embodiment of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is directed to a novel bolt configuration that includes two or more through-holes through which a pin may be placed to prevent a nut, such as a castellated nut, from unscrewing as a result of vibration. By having two or more separate through-holes, each of which may be on the same or a different plane (and which may or may not intersect) and at an angle that is between an angle formed in notches or holes in the nut, the user is best able to use at least one of the through-holes that aligns with the notches to achieve a specified torque without the need to be adding, removing, changing washers, or changing the bolt length to compensate for optimizing torque and the alignment of the through-holes and holes or notches on the nut. Of course, the skilled artisan will recognize that multiple through-holes may be provided in the bolt that will provide additional options for placing the pin (such pin includes but is not limited to, a cotter pin, a split pin, a hairpin cotter pin, a bowtie cotter pin, a circle cotter, or a lockwire) at the optimal torque. The use of the fastener of the present invention would reduce the assembly time needed as substitute fasteners would not be need to be fitted due to varying thicknesses of material and assemblies. Further, the present invention eliminated the need for the swapping out the fasteners and/or adding or removing one or more washers from a washer stack, which takes considerable time and effort in order to achieve the target or optimal torque. Further, by not having to swap fasteners or washers on rotating components, the present invention aids in maintaining the balance of the attached components.

FIG. 1 shows a helicopter 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
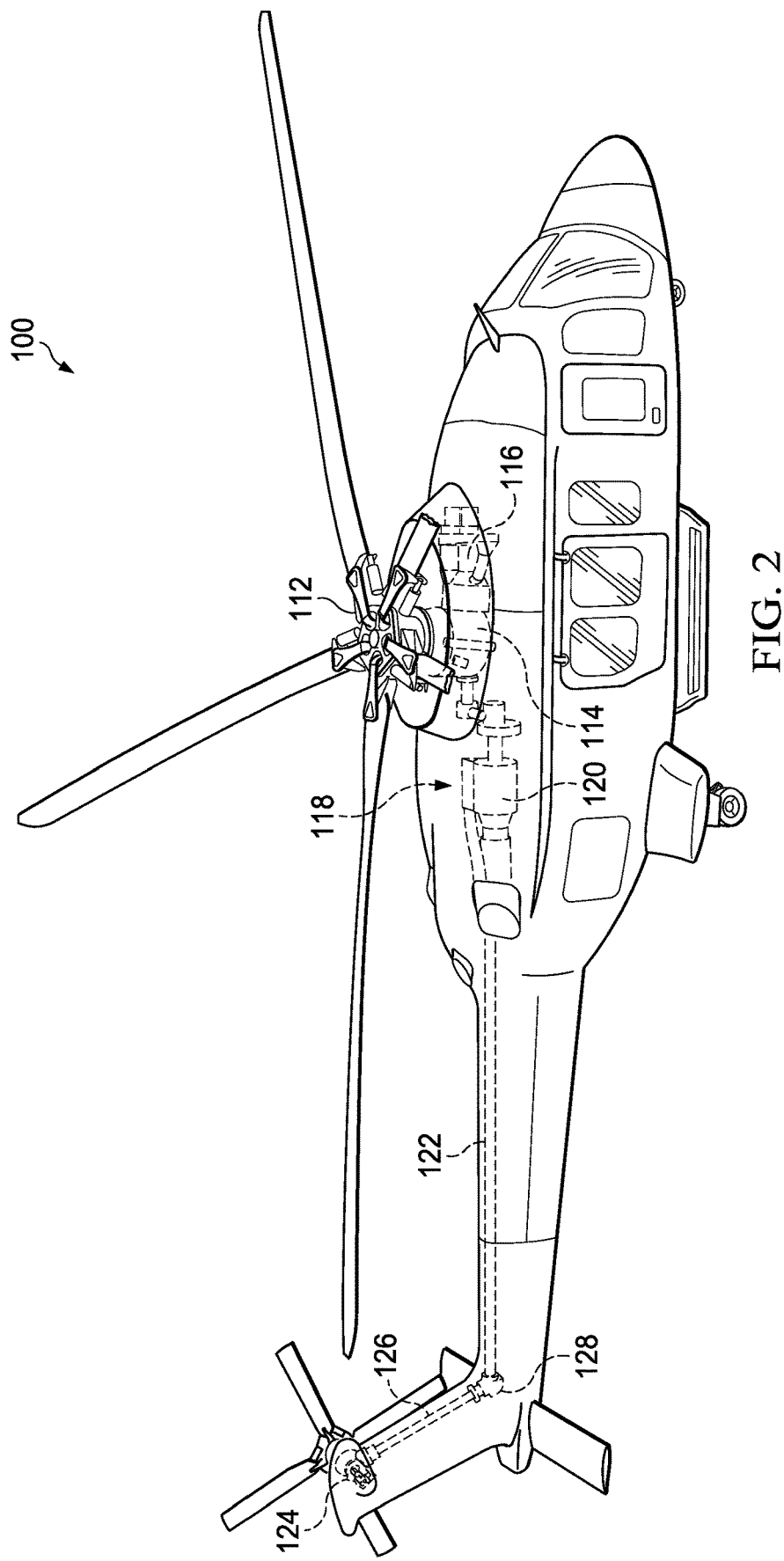
FIG. 2 shows a partial cross-section, perspective view of helicopter aircraft according to an alternative embodiment of the present application.

For example, FIG. 2 shows a partial cross-section isometric view of helicopter 100 that includes additional detail of the present invention. Helicopter 100 further includes a rotor mast 112, which is connected to the main transmission 114. The main transmission 114 is connected to one or more accessory gear boxes 116. The main transmission is connected to an engine 120, which is engine compartment 118. A tail rotor drive shaft 122 transmits mechanical rotation to the tail rotor gear box 124, which is connected via tail rotor drive shaft 126, via intermediate gear box 128.

Figure 3:
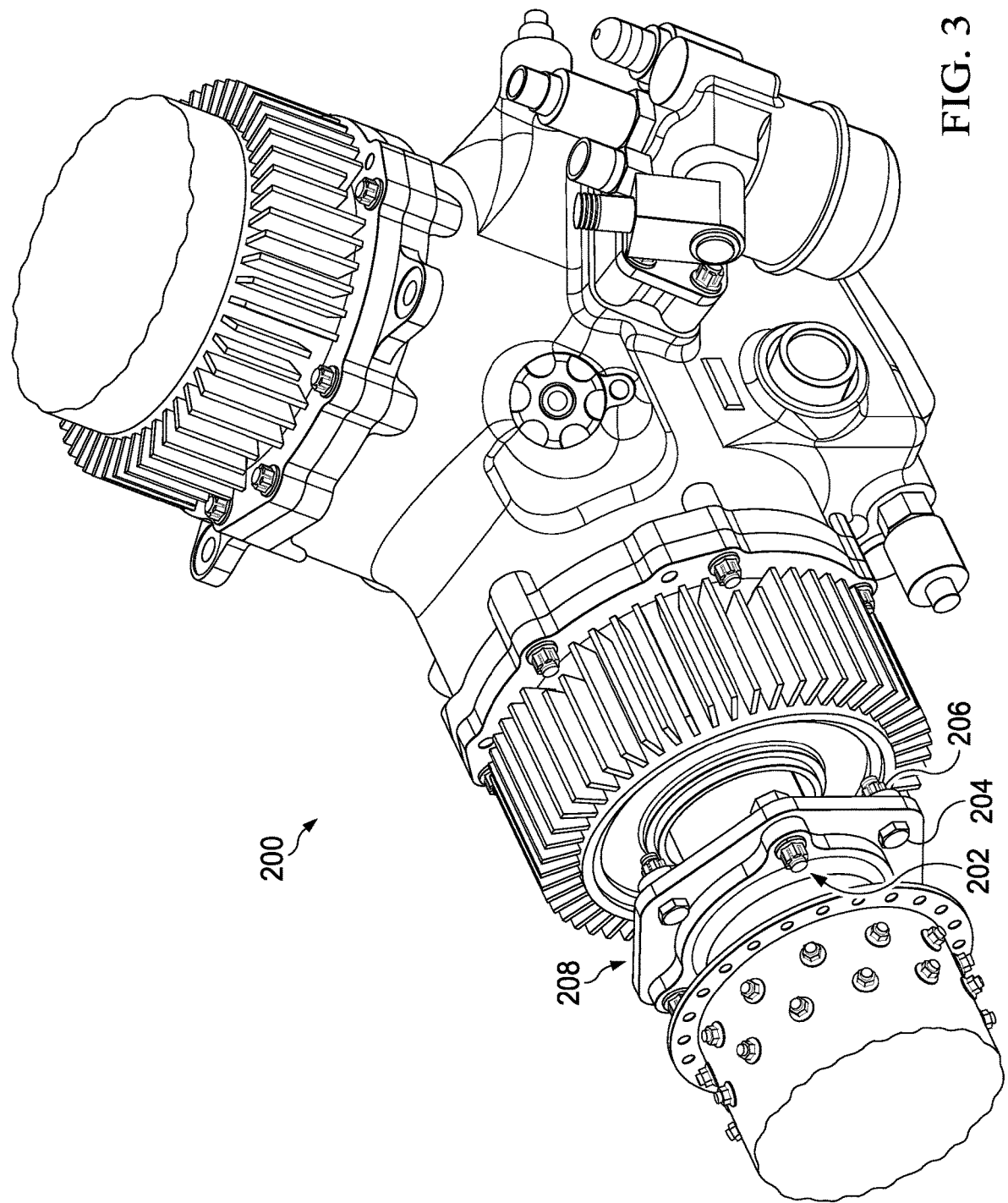
FIG. 3 shows an isometric view of an intermediate gearbox that shows the location of a threaded bolt and castellated nuts in a typical installation.

FIG. 3 shows an isometric view of an intermediate gearbox 200 that shows the location of fastener 202 in a typical installation. The fastener 202 includes a bolt 204 and a castellated nut 206 at flange 208. Due to the vibration of the intermediate gearbox, as with other parts of gearboxes, motors, or other installations that are subjected to acute or chronic vibration, the fastener 202 includes a through-hole or slit through which a pin, such as a cotter pin, is introduced through the crenellations of the castellated nuts to prevent the castellated nut from loosening. However, in a typical installation the castellated nut 206 must meet certain torque or compression requirements, which more often than not, leads to a need to add one or more washers that will allow the torque (often within a very narrow range) range to be met, while at the same time allowing the through-hole in the bolt 204 to align with the notches of the castellated nuts 206 to allow insertion of the pin.

Figure 4:
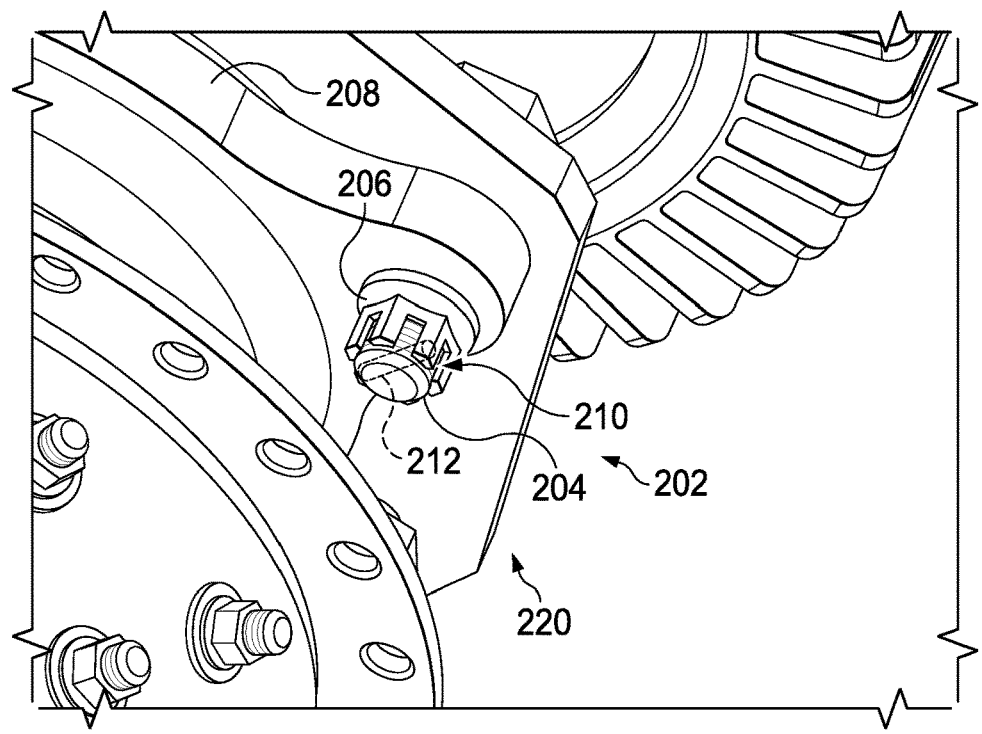
FIG. 4 shows an isometric view of a bolt shank installed through a housing and a castellated nut.

FIG. 4 shows an isometric, close-up view of FIG. 3, which is also a typical fastener 202 installed in a flange 208, shown in relation to driveshaft 220. Fastener 202 includes a bolt 204 and a castellated nut 206, in this case shown using a common bolt configuration and shows that the through-hole 212 does not align with any of the notches 210 of the nut 206. In order to align the through-hole 212 with the notch 210 at the correct torque, the skilled artisan has to resort to trial and error by inserting one or more washers (not depicted) between the castellated nut 206 and the surface of the flange 208 and/or change the length of the bolt, and then re-torque the nut and confirm that the correct torque has been achieved. If the correct torque is not achieved, the skilled artisan must again add, remove, or change the washer and/or the length of the bolt until the correct torque is achieved, which process has to be repeated with the installation of each additional fastener 202. Further, when used with a rotating member, such as driveshaft 220, adding or removing washers from one or more of the fasteners 220 can create additional vibration, which must also be corrected.

Figure 5:
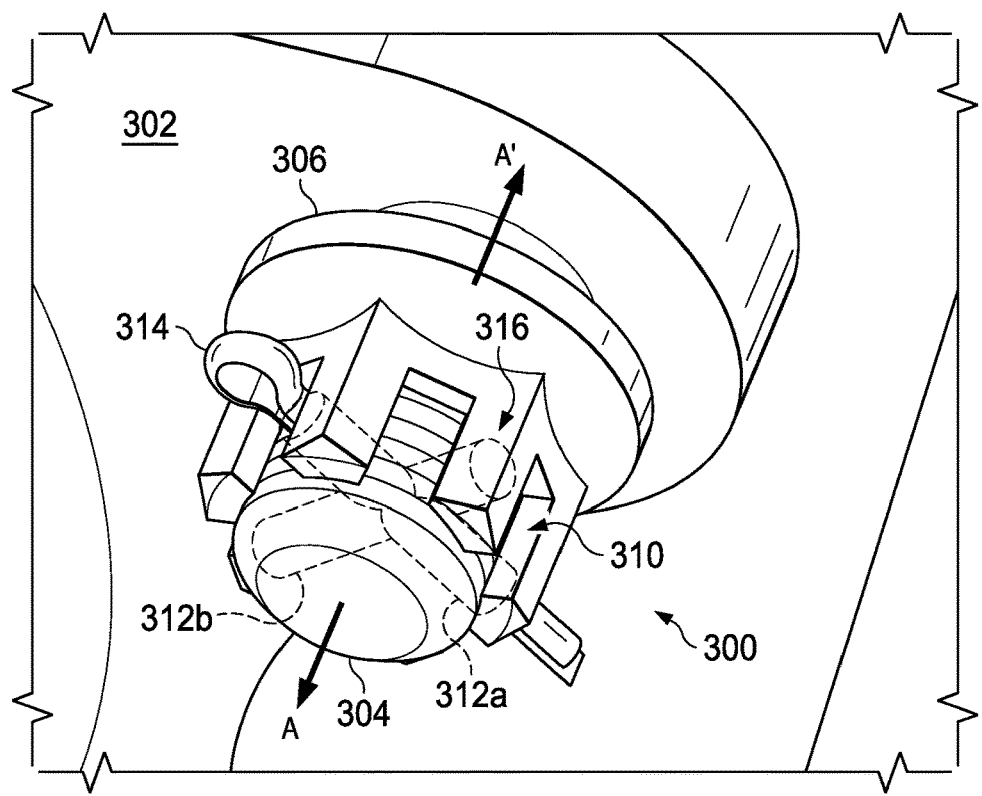
FIG. 5 shows an isometric view, close-up view of a bolt shank installed through a housing and held in place with a castellated nut and cotter pin.

FIG. 5 shows an isometric, close-up view of a fastener 300 of the present invention in which the fastener 300 is shown in a flange 302 along longitudinal axis A-A'. The bolt 304 comprises threading that matingly engages the castellated nut 306, the castellated nut 306 having notches 310 and held in place with a cotter pin 314. The cotter pin 314 traverses the through-hole 312a that aligns with the notches 310, while the other through-hole-312b did not align at a notch 310 at position 316 and is therefore not used or available for use. By having two or more separate through-holes (312a and 312b), each of which is on a different plane (which may or may not intersect) and at an angle that is between the angle between notches (for example an angle between 0 and 90 degrees), tightening of the castellated nut 306 to a specific range in torque (often a very limited range) is made possible without having to add or remove washers or changing the bolt length. The present invention allows the user to use at least one of the through-holes 312a or 312b that aligns with the notches at the specified torque without the need to be adding, removing, or changing washers or the bolt length to compensate for optimizing torque and the alignment of at least one of the through-holes 312a or 312b and notches 310. Of course, the skilled artisan will recognize that multiple through-holes may be provided in the bolt 304 that will provide additional options for placing the cotter pin 314 (or other such pin, e.g., split pin, a hairpin cotter pin, a bowtie cotter pin, a circle cotter, a cotter pin, or a lockwire) at the optimal torque. The position of the various through-holes at various locations along the length of the bolt 304 can be varied, e.g., the through-holes may be in the form of a spiral along the length of the bolt. Further, the angle between the two or more through-holes may be selected to match the angle, half-angle, one-third angle, one quarter angle, one fifth angle, etc., between the notches in the nut, e.g., a castellated nut. It is also possible to use through-holes that are on the same plane (although generally not preferable). The through-holes may be formed in the bolt by, e.g., machining or sintering the hole in place, which may be before or after adding the threading.

Figure 6:
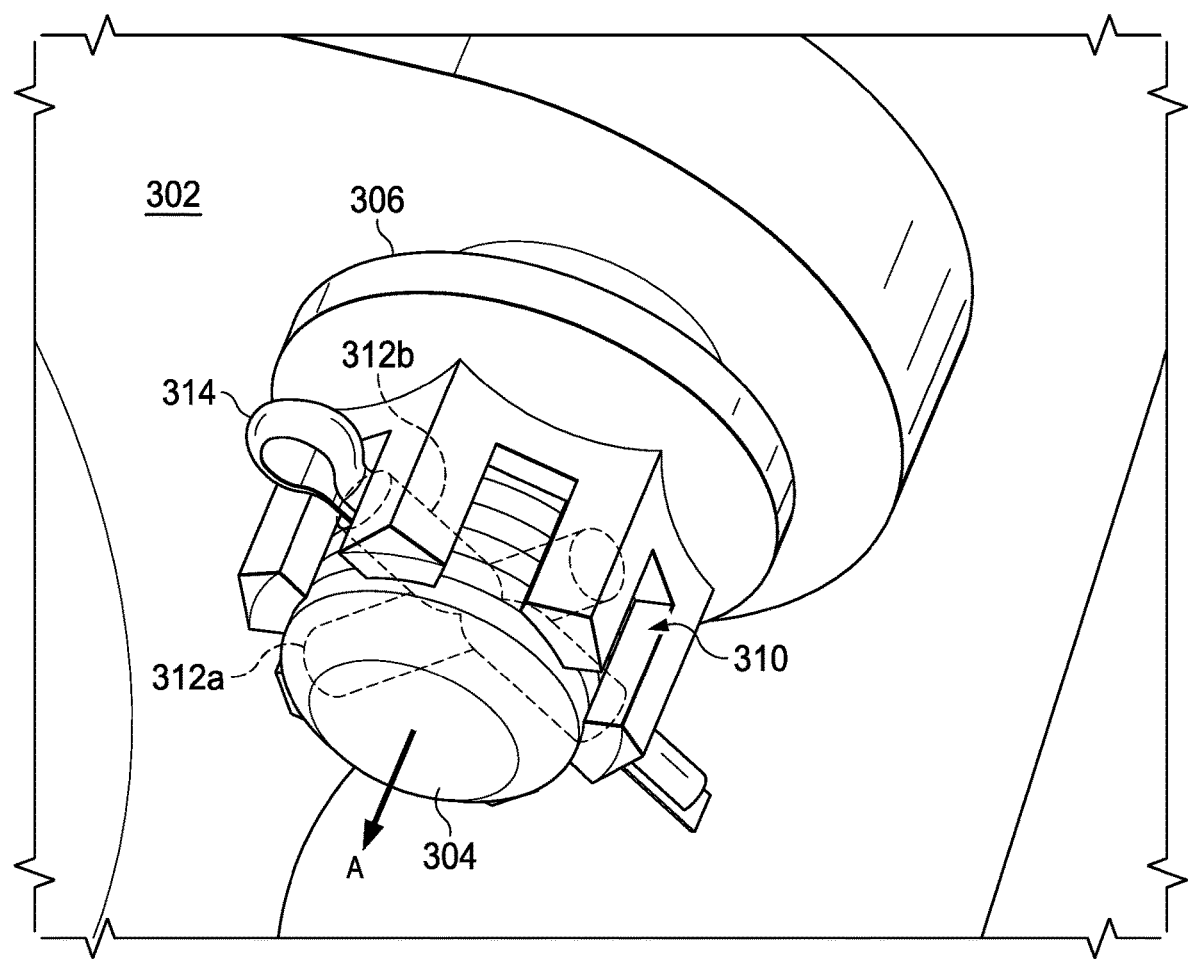
FIG. 6 shows an isometric view of a first and a second through-hole drilled generally perpendicular to the longitudinal axis of a threaded bolt, in two separate planes, and a castellated nut and cotter pin.

FIG. 6 shows an isometric view of first and second through-holes 312a, 312b drilled generally perpendicular to the longitudinal axis A-A' of a threaded bolt 304, in two separate planes, and a castellated nut 306 having one or more notches 310. In this view, the two through-holes 312a, 312b are shown as non-overlapping, that is, the two through-holes never intersect thereby maximizing the amount of material of the bolt 304 and minimizing possible weaknesses in the bolt 304. It is possible, depending on the specific application, to have the two or more through-holes 312a, 312b intersect partially or completely, as well as have additional through-holes. It is also possible to have multiple through-holes along part of the length of the bolt, or throughout the length of the bolt, e.g., the through-holes may rotate or form a helical shape along the length of the shaft of the bolt.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A fastener comprising:
a fastener body having a longitudinal axis and a first external male threaded portion, and two or more through-holes perpendicular to the longitudinal axis of the fastener body in the threaded portion, wherein each of the through-holes is on a different plane located perpendicular to the longitudinal axis of the fastener, and wherein the two or more through-holes are on a different one of the planes and angle from an adjacent through-hole of the two or more through-holes, is adapted to receive a pin.

2. The fastener of claim 1, further comprising a head opposite the first external male threaded portion.

3. The fastener of claim 1, further comprising a second external male thread opposite the first external male thread.

4. The fastener of claim 1, wherein a longitudinal axis of the two or more through-holes form an angle between 0 and 90 degrees.

5. The fastener of claim 1, wherein the through-holes are intersecting or non-intersecting.

6. The fastener of claim 1, wherein the through-holes are sized to hold a pin, wherein the pin is selected from at least one of a split pin, a hairpin cotter pin, a bowtie cotter pin, a circle cotter, or a cotter pin, or a lockwire.

7. The fastener of claim 1, wherein the first external male threaded portion extends throughout the body to a seat surface on a head portion on the body opposite the first external male threaded portion.

8. The fastener of claim 1, wherein the first external male threaded portion is configured to matingly engage a fastening member having two or more openings or notches through which the pin is inserted to prevent loosening of the fastening member as a result of vibration.

9. The fastener of claim 1, wherein the first external male threaded portion and the through-holes are configured to matingly engage a castellated fastener.

10. The fastener of claim 1, wherein each of the two or more through-holes is on a different plane.

* * * * *